United States Patent
Mosca

(10) Patent No.: US 12,251,910 B2
(45) Date of Patent: Mar. 18, 2025

(54) NON-FLAMMABLE THERMAL INSULATING COMPOSITE SUBSTRATE FOR MOTOR VEHICLES AND PRODUCTION METHOD

(71) Applicant: AGOTEX S.R.L., Vigliano Biellese (IT)

(72) Inventor: Nicolò Mosca, Vigliano Biellese (IT)

(73) Assignee: AGOTEX S.R.L., Vigliano Biellese (IT)

( * ) Notice: Subject to any disclaimer, the term of this patent is extended or adjusted under 35 U.S.C. 154(b) by 413 days.

(21) Appl. No.: 17/616,540

(22) PCT Filed: Jun. 3, 2020

(86) PCT No.: PCT/IB2020/055224
§ 371 (c)(1),
(2) Date: Dec. 3, 2021

(87) PCT Pub. No.: WO2020/245735
PCT Pub. Date: Dec. 10, 2020

(65) Prior Publication Data
US 2022/0250367 A1     Aug. 11, 2022

(30) Foreign Application Priority Data
Jun. 6, 2019   (IT) .................. 102019000008217

(51) Int. Cl.
*B32B 27/12* (2006.01)
*B29B 11/16* (2006.01)
(Continued)

(52) U.S. Cl.
CPC .............. *B32B 27/12* (2013.01); *B29B 11/16* (2013.01); *B29C 45/0001* (2013.01);
(Continued)

(58) Field of Classification Search
CPC ....... B32B 27/12; B32B 5/022; B32B 27/306; B32B 38/08; B32B 38/1875;
(Continued)

(56) References Cited

U.S. PATENT DOCUMENTS
2021/0316239 A1*  10/2021  Gorrell .................. B01D 50/20

FOREIGN PATENT DOCUMENTS
EP       2 754 373      7/2014
WO      2005/001187     1/2005
(Continued)

OTHER PUBLICATIONS

International Search Report for PCT/IB2020/055224, mailed Sep. 18, 2020, 4 pages.
(Continued)

*Primary Examiner* — Matthew D Matzek
(74) *Attorney, Agent, or Firm* — NIXON & VANDERHYE

(57) ABSTRACT

Disclosed is a non-flammable thermal insulating composite substrate for motor vehicles including: a textile component constituted by a layer of needle-sewn non-woven fabric composed of a percentage of pre-oxidized polyacrylonitrile fiber included between 40% and 70%, preferably 58% and of the remaining percentage of polyethylene glycol-terephthalate fiber, the textile component having weight preferably 400 gr/m$^2$; and a barrier fixed to the textile component using a spreading process, constituted by a thermoplastic resin based on low density polyethylene added with non-halogen flame retardants, the barrier having weight preferably 100 gr/m$^2$. The composite substrate has the following features: a thickness included between 2 mm and 5 mm, preferably 3.8 mm; a weight included between 300 gr/m$^2$ and 700 gr/m$^2$, preferably 500 gr/m$^2$; odorless; no emission of fumes;
(Continued)

dimensionally stable, even at heatstroke, with a maximum variation of 1%; and non-flammability.

12 Claims, 1 Drawing Sheet

(51) Int. Cl.
| | |
|---|---|
| *B29C 45/00* | (2006.01) |
| *B32B 5/02* | (2006.01) |
| *B32B 27/30* | (2006.01) |
| *B32B 38/00* | (2006.01) |
| *B32B 38/08* | (2006.01) |
| *D04H 1/43* | (2012.01) |
| *D04H 1/435* | (2012.01) |
| *D04H 1/4382* | (2012.01) |
| *B29K 23/00* | (2006.01) |
| *B29K 105/00* | (2006.01) |
| *B29K 105/08* | (2006.01) |
| *B29K 233/20* | (2006.01) |

(52) U.S. Cl.
CPC ............ *B32B 5/022* (2013.01); *B32B 27/306* (2013.01); *B32B 38/08* (2013.01); *B32B 38/1875* (2013.01); *D04H 1/43* (2013.01); *D04H 1/435* (2013.01); *D04H 1/43835* (2020.05); *B29K 2023/083* (2013.01); *B29K 2105/0026* (2013.01); *B29K 2105/0088* (2013.01); *B29K 2105/0854* (2013.01); *B29K 2233/20* (2013.01); *B29K 2995/0016* (2013.01); *B29K 2995/0063* (2013.01); *B29K 2995/0069* (2013.01); *B29K 2995/0096* (2013.01); *B29K 2995/0097* (2013.01); *B32B 2250/02* (2013.01); *B32B 2255/02* (2013.01); *B32B 2255/26* (2013.01); *B32B 2260/021* (2013.01); *B32B 2260/046* (2013.01); *B32B 2262/02* (2013.01); *B32B 2262/0276* (2013.01); *B32B 2262/144* (2021.05); *B32B 2305/07* (2013.01); *B32B 2305/20* (2013.01); *B32B 2307/3065* (2013.01); *B32B 2307/718* (2013.01); *B32B 2307/7265* (2013.01); *B32B 2307/732* (2013.01); *B32B 2307/734* (2013.01)

(58) Field of Classification Search
CPC ............ B32B 2250/02; B32B 2255/02; B32B 2255/26; B32B 2260/021; B32B 2260/046; B32B 2262/02; B32B 2262/0276; B32B 2262/144; B32B 2305/07; B32B 2305/20; B32B 2307/3065; B32B 2307/718; B32B 2307/7265; B32B 2307/732; B32B 2307/734; B32B 27/34; B32B 2307/306; B32B 5/06; B32B 27/18; B32B 2262/0223; B32B 2262/0246; B32B 2262/0284; B32B 2262/106; B32B 2307/308; B32B 2605/08; B32B 27/32; B29B 11/16; B29C 45/0001; D04H 1/43; D04H 1/435; D04H 1/43835; D04H 1/46; B29K 2105/0088; B29K 2105/0854; B29K 2233/20; B29K 2995/0016; B29K 2995/0063; B29K 2995/0069; B29K 2995/0096; B29K 2023/083; B29K 2105/0026; B29K 2995/0097; Y02P 20/582; B60R 13/083; B60R 13/0869; B60R 13/0876; C08K 5/0066
USPC .......................... 428/920–921; 442/136–147
See application file for complete search history.

(56) References Cited

FOREIGN PATENT DOCUMENTS

| | | |
|---|---|---|
| WO | 2005/115739 | 12/2005 |
| WO | 2018/117743 | 6/2018 |
| WO | 2019/090659 | 5/2019 |

OTHER PUBLICATIONS

Written Opinion of the ISA for PCT/IB2020/055224, mailed Sep. 18, 2020, 7 pages.

* cited by examiner

NON-FLAMMABLE THERMAL INSULATING COMPOSITE SUBSTRATE FOR MOTOR VEHICLES AND PRODUCTION METHOD

This application is the U.S. national phase of International Application No. PCT/IB2020/055224 filed 3 Jun. 2020, which designated the U.S. and claims priority to IT Patent Application No. 102019000008217 filed 6 Jun. 2019, the entire contents of each of which are hereby incorporated by reference.

BACKGROUND OF THE INVENTION

Field of the Invention

The present invention operates in the field of heat-protective materials, in particular in the automotive field. More in detail, the present invention proposes a new and innovative material for protecting against heat which is non-flammable.

Description of the Related Art

In the automotive field, research on new materials and, in particular, on new polymers, is always at the forefront due to the increasing market needs. Both clients and international laws have for years pushed automobile manufacturers to constantly innovate the materials in order to provide maximum technical performances as well as savings in terms of weight, emissions and performances of the vehicle.

Among the most important features that determine consumer preference, there is without a doubt the comfort conditions of the driver and passenger compartment, which thus must not be affected by the heat coming from the engine or coming from the exhaust manifolds and from the muffler itself and possibly from the battery compartment of hybrid or electric cars. In order to ensure the correct climate conditions inside the vehicle, numerous materials have therefore been developed that act as heat barrier.

The heat barriers are variously situated on the vehicles, especially close to the engine and engine compartment so that this is not overheated, starting spontaneous combustion or even fire, and also for ensuring the comfort of the driver/vehicle compartment interior, protecting it from the high temperatures produced.

The problem pertaining to this type of constituent element of the vehicle lies in the fact that optimal features are obtained from the combination of mechanical and thermal properties of multiple materials.

When multiple materials are arranged in layers, there is the risk of separation of the different layers. Analogously, when a more rigid material is coupled to a less rigid material, there is a crushing of this second material, with consequent loss of the requested performances.

When multiple materials are worked together in order to combine the properties thereof in a single monolithic and hence indivisible object, the production process comprises various steps that increase the cost of the finished object and hence lower the profitability of the industrial plant engaged in the production thereof.

More in detail, the coupling of a textile material and of a plastic is often attained with mechanical fastening or by means of glue, increasing the weight and decreasing the seal between the various materials.

Several international patents regard this vehicle component type, such as the patent of Korean origin, extended worldwide as WO 2016 190 596. Such patent regards a polyketone fiber material obtained via centrifugation of the copolymer, washing, drying and stretching. The polyketone fiber has excellent properties of mechanical stress resistance, elongation, water resistance, heat resistance and heat conductivity and allows the production of objects that are highly resistant to high temperatures, and even antiprojectile.

Even if the quality of the object thus produced is high, given the high production cost this is used for tanks and other military equipment, while it is not convenient for larger productions. The object of the present patent is therefore that of uniting the advantages of coupling materials with the due technical performances, of indivisibility of the obtained composite and of inexpensive production costs.

SUMMARY OF THE INVENTION

According to the present invention, a non-flammable and thermal insulating composite substrate for motor vehicles is attained which effectively resolves the abovementioned problems.

The features of non-flammability and of no emission of fumes are manifested when the substrate is exposed to the flame on the textile side.

This advantageously comprises a textile component treated in an impregnating bath which renders it a preferably water-oil repellent barrier.

The textile component is constituted by a layer of needle-sewn non-woven fabric composed of a percentage of pre-oxidized polyacrylonitrile fiber comprised between 40% and 70%, preferably 58% and of the remaining percentage of polyethylene glycol-terephthalate fiber. The textile component has weight comprised between 200 $gr/m^2$ and 600 $gr/m^2$, preferably 400 $gr/m^2$.

The barrier, according to a production process described below, will be advantageously fixed to a surface of the textile component.

Said barrier is constituted by a thermoplastic resin based on low density polyethylene added with non-halogen flame retardants.

It can be made of polyethylene, polyamide or of ethylene vinyl acetate and will have weight comprised between 30 $gr/m^2$ and 150 $gr/m^2$, preferably 100 $gr/m^2$.

Overall, the composite substrate will have the following features:

thickness comprised between 2 mm and 5 mm, preferably 3.8 mm;
weight comprised between 300 $gr/m^2$ and 700 $gr/m^2$, preferably 500 $gr/m^2$;
odorless;
no emission of fumes if exposed to the flame on the textile side;
non-flammable if exposed to the flame on the textile side;
dimensionally stable, even to heatstroke, with a maximum variation of 1%.

Preferably it will also have the characteristic of being water-oil repellent.

Several particular embodiments have the advantage of being recyclable. The composite substrate, object of the present industrial invention patent application, once molded on the face that has the barrier formed with the desired plastic finishes, as described below, results non-flammable and lacks emission of fumes even if exposed to the flame on both faces.

In the automotive field, the composite substrate, object of the present invention, is used for being inserted in an injection mold to be co-molded with a predetermined plastic polymer, on the face that has the barrier formed thereon. The composite substrate in fact adheres to the plastic polymer at the outer surface provided with the barrier which, being slightly rough, due to a plurality of troughs and projections, allows the strong and stable fixing of said plastic polymer on the composite substrate. In addition, the presence of the aforesaid barrier prevents, during the molding step and especially during injection of the plastic polymer, the plastic polymer being heated and hence in the liquid state from traversing and spreading into the underlying non-flammable and thermal insulating textile layer which must instead be strictly maintained intact. The present industrial invention patent application intends to describe and claim an innovative non-flammable thermal insulating composite substrate, adapted to become a monolithic element provided with a molded side, on which injection molded plastic elements are present, in turn anchored on the face of a barrier-forming layer stably connected, this time by means of its opposite face, to a non-flammable and thermal insulating textile mattress.

The advantages offered by the present invention are evident in light of the description set forth up to now and will be even clearer due to the enclosed figures and to the relative detailed description.

BRIEF DESCRIPTION OF THE DRAWINGS

The invention will be described hereinbelow in at least one preferred embodiment by way of a non-limiting example with the aid of the enclosed figures, in which.

DESCRIPTION OF THE PREFERRED EMBODIMENTS

The present invention will now be illustrated as a merely exemplifying but non-limiting or non-binding example, with reference to the figures which illustrate several embodiments relative to the present inventive concept.

Figure 1:
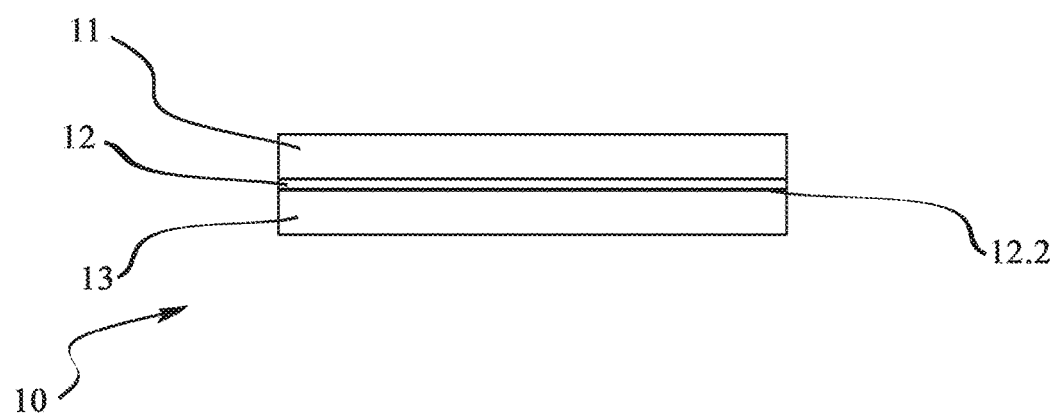
FIG. 1 shows a schematic section of the composite material that forms the substrate 10, object of the present invention.
Figure 2:
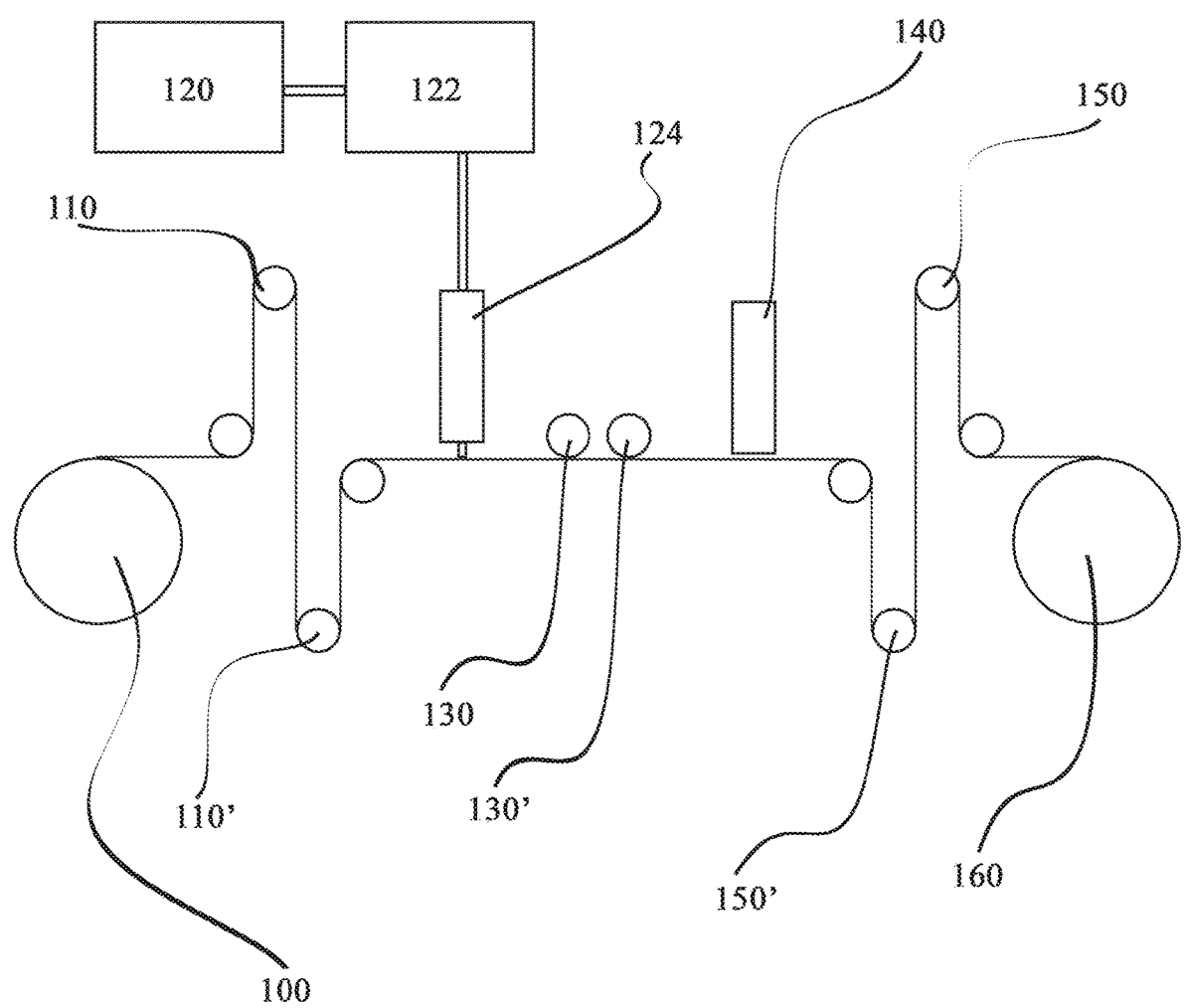
FIG. 2 illustrates the scheme of the production plant for making the claimed composite substrate 10.

With reference to FIG. 2, the production plant adapted to make the composite substrate 10, object of the present invention, is shown.

This consists of an unrolling roller 100, a plurality of first tensioning rollers 110-110', a tank 120 of barrier-forming agent 12, an oven 122 and a dispenser device 124, a plurality of rolling rolls 130-130', a cooling device 140, a plurality of second tensioning rollers 150-150' and a rolling roller 160.

The attainment method then provides for:

A first step of unrolling a roll of textile component 11, by means of said unrolling roller 100. The textile component 11 is constituted by a layer of needle-sewn non-woven fabric composed of pre-oxidized polyacrylonitrile fiber in a percentage that varies from 40% to 70% preferably 58% and by the remaining percentage of polyethylene glycol-terephthalate fiber;

A second step of tensioning and aligning said textile component 11 by means of the first tensioning rollers 110-110';

A third step of heating a predetermined quantity of barrier-forming agent 12 at a temperature comprised between 50° C. and 350° C. The barrier-forming agent 12 is constituted by a low density polyethylene powder added with non-halogen flame retardants and it is stored in a tank 120 connected to the oven 122 where the heating occurs;

A fourth step of spreading the barrier-forming agent 12 on one face of the textile component 11 by means of a dispenser 124;

A fifth step of rolling the barrier-forming agent 12 on the textile component 11 by means of the rolling rolls 130-130';

A sixth step of cooling the barrier-forming agent 12 by means of a cooling device 140. The cooling of the barrier-forming agent 12 on the textile component 11 determines the irreversible adhesion and hence generates the desired composite substrate 10;

A seventh step of tensioning and aligning the composite substrate 10 just produced, by means of the second tensioning rollers 150-150';

An eighth step of rolling the composite substrate 10 by means of a rolling roller 160.

Finally, it is clear that modifications, additions or variations that are obvious for the man skilled in the art can be made to the invention described up to now, without departing from the protective scope provided by the enclosed claims.

The invention claimed is:

1. Non-flammable thermal insulating composite substrate for motor vehicles, comprising a textile component and a barrier;

said textile component consisting of a layer of needle-sewn non-woven fabric composed of a percentage of pre-oxidized polyacrylonitrile fiber ranging from 40% to 70% by weight, and of the remaining percentage of polyethylene glycol-terephthalate fiber, said textile component having a weight of between 200 g/m$^2$ and 600 g/m$^2$;

said barrier being irreversibly fixed to a surface of said textile component through a spreading process; said barrier consisting of a thermoplastic resin based on low density polyethylene added with non-halogen flame retardants, said barrier having a weight of between 30 g/m$^2$ and 150 g/m$^2$;

said composite substrate having the following features: thickness of between 2 mm and 5 mm;
weight of between 300 g/m$^2$ and 700 g/m$^2$;
odorless;
no emission of fumes when said textile component is exposed to flame;
dimensionally stable, with a maximum dimensional variation of 1%;
non-flammability when said textile component is exposed to flame.

2. The non-flammable thermal insulating composite substrate for motor vehicles, according to claim 1, wherein said barrier is provided with reliefs and recesses which increase the adhesion of said textile component thereto.

3. The non-flammable thermally insulating composite substrate for motor vehicles, according to claim 1, wherein by impregnating said textile component in a bath, said textile component becomes a water-oil repellent barrier.

4. The non-flammable thermal insulating composite substrate for motor vehicles, according to claim 1, further comprising a layer made of any plastic polymer, engaged externally to said barrier.

5. A method for producing a motor vehicle component, comprising:

inserting a non-flammable thermal insulating composite substrate for motor vehicles comprising a textile component and a barrier into an injection mold;

said textile component consisting of a layer of needle-sewn non-woven fabric composed of a percentage of pre-oxidized polyacrylonitrile fiber ranging from 40% to 70% by weight, and of the remaining percentage of polyethylene glycol-terephthalate fiber, said textile component having a weight of between 200 g/m$^2$ and 600 g/m$^2$;

said barrier being irreversibly fixed to a surface of said textile component through a spreading process; said barrier consisting of a thermoplastic resin based on low density polyethylene added with non-halogen flame retardants, said barrier having a weight of between 30 g/m$^2$ and 150 g/m$^2$;

said composite substrate having the following features:
thickness of between 2 mm and 5 mm;
weight of between 300 g/m$^2$ and 700 g/m$^2$;
odorless;
no emission of fumes when said textile component is exposed to flame;
dimensionally stable, with a maximum dimensional variation of 1%;
non-flammability when said textile component is exposed to flame; and co-molding the composite substrate with a predetermined plastic polymer, such that said composite substrate adheres to the plastic polymer at an outer surface of said barrier.

6. Method for producing a non-flammable thermal insulating composite substrate for motor vehicles, comprising:
unrolling a roll of textile component according to claim 1, by means of an unrolling roller;
tensioning and aligning said textile component through a plurality of first tensioning rollers;
heating a predetermined amount of barrier-forming agent at a temperature ranging from 50° C. to 350° C.; said heating taking place in a special oven;
spreading said barrier on one face of said textile component through a dispenser;
rolling said barrier onto said textile component through a plurality of rolling rolls;
cooling said barrier-forming agent by means of a cooling device and irreversible adhesion between said textile component and said barrier-forming agent, generating said composite substrate;
tensioning and aligning said composite substrate through a plurality of second tensioning rollers; and
rolling said composite substrate by means of a rolling roller;

said textile component consisting of a layer of needle-sewn non-woven fabric composed of a percentage of pre-oxidized polyacrylonitrile fiber ranging from 40% to 70% by weight, and of the remaining percentage of polyethylene glycol-terephthalate fiber, said textile component having a weight of between 200 g/m$^2$ and 600 g/m$^2$;

said barrier being irreversibly fixed to a surface of said textile component; said barrier consisting of a thermoplastic resin based on low density polyethylene added with non-halogen flame retardants, said barrier having a weight of between 30 g/m$^2$ and 150 g/m$^2$;

said composite substrate having the following features:
thickness of between 2 mm and 5 mm;
weight of between 300 g/m$^2$ and 700 g/m$^2$;
odorless;
no emission of fumes when said textile component is exposed to flame;
dimensionally stable, with a maximum dimensional variation of 1%;
non-flammability when said textile component is exposed to flame.

7. The method for producing a non-flammable thermal insulating composite substrate for motor vehicles, according to claim 6, further comprising a step for storing said barrier-forming material in a special tank in which said barrier-forming material is stored in powder; said tank being connected to said oven in turn upstream of said dispenser.

8. The non-flammable thermal insulating composite substrate for motor vehicles of claim 1, wherein the layer of needle-sewn non-woven fabric is composed of 58% by weight pre-oxidized polyacrylonitrile fiber, said textile component has a weight of 400 g/m$^2$, said barrier has a weight of 100 g/m$^2$, and said composite substrate has a thickness of 3.8 mm and a weight of 500 g/m$^2$.

9. The non-flammable thermally insulating composite substrate for motor vehicles, according to claim 2, wherein by impregnating said textile component in a bath, said textile component becomes a water-oil repellent barrier.

10. The non-flammable thermal insulating composite substrate for motor vehicles, according to claim 2, further comprising a layer made of any plastic polymer, engaged externally to said barrier.

11. The non-flammable thermal insulating composite substrate for motor vehicles, according to claim 3, further comprising a layer made of any plastic polymer, engaged externally to said barrier.

12. The non-flammable thermal insulating composite substrate for motor vehicles, according to claim 9, further comprising a layer made of any plastic polymer, engaged externally to said barrier.

\* \* \* \* \*